US011005974B2

(12) United States Patent
Kremer

(10) Patent No.: US 11,005,974 B2
(45) Date of Patent: May 11, 2021

(54) METHOD AND APPARATUS FOR ACCESSING DATA OR FUNCTIONS OF A PROGRAMMABLE CONTROLLER VIA A NETWORK PROTOCOL

(71) Applicant: Siemens Aktiengesellschaft, Munich (DE)

(72) Inventor: Eugen Kremer, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 274 days.

(21) Appl. No.: 15/418,323

(22) Filed: Jan. 27, 2017

(65) Prior Publication Data

US 2017/0223144 A1   Aug. 3, 2017

(30) Foreign Application Priority Data

Jan. 28, 2016   (EP) ..................................... 16153052

(51) Int. Cl.
*H04L 29/06* (2006.01)
*G05B 19/05* (2006.01)
*H04L 29/08* (2006.01)

(52) U.S. Cl.
CPC .............. *H04L 67/42* (2013.01); *G05B 19/05* (2013.01); *G05B 2219/15038* (2013.01); *H04L 67/02* (2013.01)

(58) Field of Classification Search
CPC ......... H04L 29/06047; H04L 29/08182; H04L 29/08225; H04L 29/08522; H04L 29/0872;

(Continued)

(56) References Cited

U.S. PATENT DOCUMENTS 6,640,140 B1 * 10/2003 Lindner ............. G05B 19/0421
700/18
2003/0061311 A1 * 3/2003 Lo ............................. G06F 8/20
709/220

(Continued)

FOREIGN PATENT DOCUMENTS

CN         1802645       7/2006
CN        1012588495     9/2008

(Continued)

OTHER PUBLICATIONS

Stoidner, Christop et al. "Sequence Controlled Web Services for Programmable Logic Controllers", 13th IFAC Symposium on Information Control Problems in Manufacturing, XP55236495, 2009.

(Continued)

*Primary Examiner* — Younes Naji
*Assistant Examiner* — Da T Ton
(74) *Attorney, Agent, or Firm* — Cozen O'Connor

(57) ABSTRACT

A method and a programmable controller for accessing data or functions, the data being stored in a database of the programmable controller and the database being assigned to an application program of the programmable controller, and a web server of the programmable controller being accessed by a client via the network protocol, where at least one program module of the automation program of the programmable controller is assigned to a web service of the web server, and where execution of the program module is initiated by the web service such that flexible and simply implementable access to data or functions of the programmable controller is therefore possible, and the access to the data or functions can be controlled load-dependently.

16 Claims, 2 Drawing Sheets

(58) Field of Classification Search
CPC .. H04L 67/1002; H04L 67/1091; H04L 67/42
USPC .................................. 709/201–203, 217–219
See application file for complete search history.

(56) References Cited

U.S. PATENT DOCUMENTS

| | | | |
|---|---|---|---|
| 2003/0065855 A1* | 4/2003 | Webster ............... | G05B 19/054 |
| | | | 710/260 |
| 2006/0041531 A1 | 2/2006 | Provoost | |
| 2007/0011227 A1* | 1/2007 | Johnson ................. | G06F 16/95 |
| | | | 709/203 |
| 2008/0005129 A1* | 1/2008 | Herberth ............... | G06F 16/972 |
| 2012/0173671 A1* | 7/2012 | Callaghan .............. | G05B 19/05 |
| | | | 709/217 |
| 2012/0290539 A1* | 11/2012 | Bryant ................... | G06F 16/27 |
| | | | 707/661 |
| 2013/0086245 A1* | 4/2013 | Lu .......................... | G05B 13/02 |
| | | | 709/223 |
| 2014/0337521 A1 | 11/2014 | Neubert et al. | |
| 2017/0060726 A1* | 3/2017 | Glistvain ................. | G06F 8/38 |

FOREIGN PATENT DOCUMENTS

| | | |
|---|---|---|
| EP | 2 506 098 | 10/2012 |
| WO | WO 2010/099802 | 9/2010 |
| WO | WO 2013/087940 | 6/2013 |

OTHER PUBLICATIONS

Office Action dated Nov. 2, 2018 issued in Chinese Patent Application No. 201710062940.7.

* cited by examiner

METHOD AND APPARATUS FOR ACCESSING DATA OR FUNCTIONS OF A PROGRAMMABLE CONTROLLER VIA A NETWORK PROTOCOL

BACKGROUND OF THE INVENTION

1. Field of the Invention

The invention relates to a method for accessing data or functions of a programmable controller via a network protocol, and to a programmable controller with access to its data or functions via a network protocol.

2. Description of the Related Art

Data or functions of a programmable controller, for example, production data, state information, control parameters and the like are conventionally accessed via an operation and observation unit, which generally has a graphical user interface for monitoring and operating an automated process or the like. The operation and observation units are generally connected via a data network to the programmable controller. The access to the data or functions of the programmable controller is generally performed via proprietary protocols from the field of automation. Besides these data or function accesses in more or less closed architectures and systems, there is an increasing requirement to make the data of a programmable controller generally accessible, in particular via the Internet and by using the usual protocols there, for example HTTP. To this end, it is known to equip programmable controllers with web servers that deal with corresponding requests of clients (e.g., web browsers, or cellphone applications).

One problem with the conventional use of web servers in programmable controllers is that the web server integrated into the programmable controller must exchange the data with the automation program (SPS program), or call its functions, although in general a web server cannot or should not have direct access to functions, variables and parameters of an automation program. For this reason, an additional data module is usually defined for the automation program, i.e., a "control data module". For the automation program, a special code module ("WWW module") is then additionally defined, which is necessarily called in each cycle and writes the data to be exchanged into the control data module, or reads them out therefrom. A disadvantage with this method, however, is that, on the one hand, a permanent load is generated by calling the "WWW module" even in cases in which no data are currently meant to be exchanged and, on the other hand, the data exchange is rigidly connected to the execution cycle of the automation program, and can therefore often occur only with a delay. Controlled calling of functions of the programmable controller is therefore not at all possible.

Besides the explained access via a web server in the programmable controller, it is also known to deliver instructions and parameters to the programmable controller via the OPC-UA protocol, and in the same way to deliver data from the programmable controller to an OPC-UA client unit, although this requires the construction of an OPC-UA client/server architecture and therefore entails high outlay. Furthermore, with this approach there are also problems in relation to the cycle-oriented data exchange between the local OPC-UA server of the programmable controller and the automation program.

SUMMARY OF THE INVENTION

In view of the foregoing, it is an object of the invention to provide a simple and reliable solution for access to the data of a programmable controller via a network protocol, which prevents a possible overload of the programmable controller due to the data access and operates substantially independently of the cycle of the automation program.

This and other objects are achieved in accordance with the invention by a programmable controller having selected program modules of the automation program available as parts of a web service. These selected program modules may call external applications, such as web browsers or applications on other data-processing units, via a network protocol, such as hypertext transfer protocol (HTTP). An administration instance (task scheduler) integrated in the programmable controller then decides when these requests entered via the network can be processed, depending on the workload of the programmable controller. The program modules of the automation program that are then called may both read out internal values (data, variables, parameters) and modify them. Furthermore, functions of the automation program may then be called in a controlled way, i.e., exemplary functions may be started or ended. The data manipulated by the web server may thus not only relate to parameters, variables and the like (i.e., in general user data) but may also relate to instructions, functionalities, methods and the like (in general "functions"), and therefore relates to the control of a function execution or the like.

It is also an object of the invention to provide a method and a programmable controller, where the method access data or functions of the programmable controller via a network protocol, the data being stored in a database of the programmable controller and the database being assigned to an application program of the programmable controller, and where a web server of the programmable controller is accessed by a client via the network protocol. Here, at least one program module, which may receive both function calls and direct accesses to the database, of the automation program of the programmable controller is assigned to a web service of the web server, where execution of the program module is initiated by the web service. In one embodiment, access to the data of the programmable controller is performed by the program module, in which case, for example, either at least one parameter provided by the web service may be written into the database as describing the data, or the data may be read out from the database and transmitted as the parameter to the web service, or a function may be called, or a mixed form of these actions may be performed. Flexible and simply implementable access to data or functions of the programmable controller is therefore possible, and the access to the data and functions can also be controlled load-dependently.

It is also an object of the invention to provide a programmable controller having access to its data or functions via a network protocol, the data being stored in a database of the programmable controller, and the programmable controller having a web server for access to the data or functions. Here, the programmable controller is configured so that at least one program module, which may contain a function or addresses a function, of the automation program is assigned to a web service of the web server, the web service being configured to initiate execution of the program module, and the program module advantageously being configured to provide access to the data and/or further functions, provision advantageously being made that either at least one parameter provided by the web service is written into the database as describing the data, or at least some of the data are read out from the database and transmitted as the parameter to the web service, or a further function may be initiated, or a mixed form of these actions may be performed. By such a programmable controller, the advantages already explained with reference to the method in accordance with the invention can be achieved.

In programmable controllers, it is generally important to comply with a predetermined maximum cycle time. So that this criterion can be complied with, in one advantageous embodiment of the invention, a decision is always made by an administration device of the programmable controller whether a call, initiated via the web access, of the corresponding program module is performed contingently on the situation, or not.

To this end, it is advantageous for this administration device to have knowledge about the free computing time available in or before/after the current cycle. The knowledge about the program modules to be called information may be obtained by measuring the execution time for previous calls of these program modules. In this way, the decision about the processing of the network requests can advantageously be made according to the workload of the programmable controller. In another advantageous embodiment, the requests entered via the network protocol may also belong to different priority classes, either all requests or, for example, only high-priority requests, being processed depending on the current workload of the programmable controller.

In one advantageous embodiment of the invention, the execution of the program module may be performed in the event of an initiation by an external request as soon as a run of the automation program has reached a checkpoint, i.e., a defined execution point, or as soon as the run of the automation program has reached a state defined in another way, such as a cycle start or a cycle end of the cycle-based automation program. A plurality of checkpoints may also be provided in this case, so that the opportunity to process requests by running the predefined program modules occurs several times in a single cycle. Correspondingly, a memory or register or "flag" for open requests is on the one hand advantageously provided and, on the other hand, system code modules are advantageously provided, which are called by the user program and deliver a corresponding return value to the user program, by which immediate processing of the pending requests can be initiated, for example by the corresponding functions being brought to execution.

In another embodiment, the initiated execution of the program module may occur without a delay by interrupting a part of the automation program which is running at this time, i.e., by an "interrupt", for example. The number of possible interrupts per cycle may, however, be restricted in this case. Furthermore, the authorization of an interrupt may also be linked with conditions, for example also to a current workload of the programmable controller.

Advantageously, a web browser or an application of a mobile terminal or a cloud-based service is used as the client. The programmable controller is therefore accessible for generally conventional units of computer technology and consumer electronics, so that a wide range of possible applications is opened up, such as home automation, or mobile manufacturing control.

Advantageously, a data module of the automation program is used as the database. In this way, it is unnecessary to create separate data fields, variables or data memories for the data exchange between the programmable controller and a client accessing the latter via the network protocol. Furthermore, this has the advantage that the answering of requests via the network protocol can be programmed in the original programming language of the programmable controller, so that a programmer of the application program can work with their usual knowledge and tools. It furthermore has the advantage that the control of the data remains with the automation program, so that access control, user authentication, etc. for the web-based requests can be performed in a program module of the automation program.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

An exemplary embodiment of the method according to the invention and of the programmable controller according to the invention will be explained below with the aid of the drawings, in which.

DETAILED DESCRIPTION OF THE EXEMPLARY EMBODIMENTS

Figure 1:
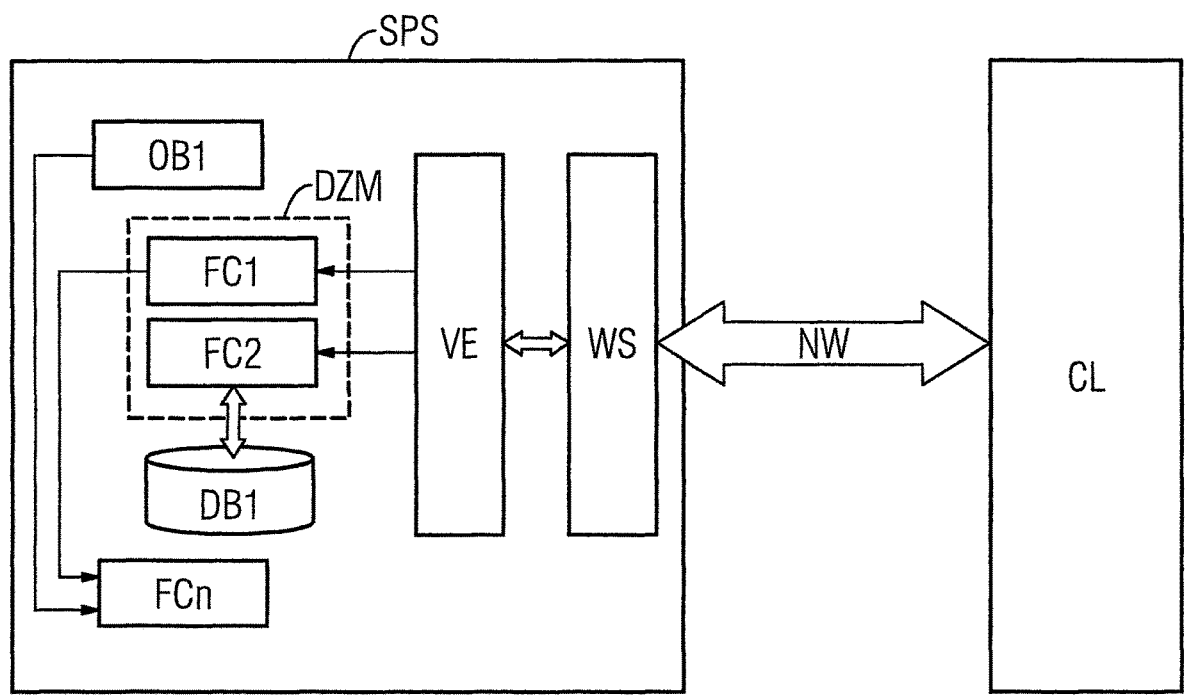
FIG. 1 shows a schematic block diagram of the data exchange of essential modules of an architecture in accordance with the invention.

FIG. 1 schematically represents an arrangement consisting of a programmable controller SPS and a client CL, which exchange data with one another via a network NW with the aid of an Internet protocol (for example, HTTP). The client CL may be a computer with a web browser, a mobile unit (Tablet PC, smartphone, laptop computer, or the like) having an application ("App"), a cloud-based service or another entity exchanging data via an Internet protocol, such as an operation and observation unit for an industrial application.

The programmable controller SPS is a microprocessor-controlled component, which is used, for example, in an industrial automation arrangement, a controlled industrial process, in building automation or in another control task. The programmable controller SPS is equipped with a web server WS, which exchanges data with the client CL via the network NW and via an Internet protocol. The web server WS is connected inside the programmable controller SPS to an administration device VE that coordinates the data exchange between the web server WS and an automation program; because of its time coordination function, the administration device VE may also be referred to as a "scheduler".

Various modules of an industrial automation program, with the aid of which data access of the client CL via the network NW and the web server WS, or the administration device VE, will be explained below, are represented in the left-hand part of the programmable controller SPS.

An automation program is generally executed in a cycle-based manner, i.e., the program components important for a control task are processed in a cyclically repetitive manner in a fixed time framework. A program module OB1 (organization module 1), which is processed in the framework of the cycle and by which other program components, such as functions, function modules and calls for the functions or function components, i.e., "function calls" (FC) are driven, may be responsible for the cycle control. An automation program furthermore generally comprises "data modules" (DB), in which variables and parameters of the automation program may be combined, a single data module DB1 being shown by way of example in the representation shown here.

A read access of the client CL to data of the data module DB1 is discussed below; a write access or a mixed read and write access may, however, be performed in a similar way in accordance with the invention.

During a planning phase of an industrial automation arrangement, or during programming of the programmable controller SPS, individual program modules FC1, FC2 or calls for such program modules as functions, which may, for example, contain or be methods, are enabled for calling by the web server, i.e., these program modules or function calls FC1, FC2 can be called (for example, started) by an instance that does not itself belong to the automation program. This instance is, in the present case, the web server WS, in which case the calls, initiated by the web server WS, of the functions for direct access DZM, i.e., here the program modules FC1, FC2, may optionally be allowed, denied or time-controlled, or delayed, by the administration device VE. Thus, in principle, although implemented asynchronously with the respective cycle of the automation program, the call of the program modules FC1, FC2 may nevertheless, for example, be suppressed by the administration device VE when the functionality of the automation program would otherwise be endangered, or such a call may be delayed until the cycle of the automation program has reached a corresponding state, such as a cycle start, cycle end or the reaching of a checkpoint, i.e., of a predefined execution state of the automation program.

A client CL may encode the program module FC1, FC2 to be addressed with the call or a request, as well as the data (for example, variables) to be addressed in this case, in a URL, so that a defined call path is obtained for the corresponding program module FC1, FC2. Such a URL is, for example, transmitted via the HTTP protocol via the network NW to the web server WS of the programmable controller, and evaluated ("composed") there. From the information of the URL, the web server WS then generates a call for one of program modules FC1, FC2. In a first example, it will be assumed that the program module FC2 is called. The administration device VE may then enable this call, for example in the case in which a cycle of the automation program has reached the end and sufficient computing time to process the task is still available before the start of the next cycle. By the automation program, the enabled program module FC2, which may, for example, access the data module D1 and read out from there the variables specified by means of the request, is thus then executed. The information then obtained may be transmitted to the web server WS which, for example, converts this information into a desired format (for example JSON, XML) and transmits it to the client CL, which in turn receives the data in a webpage, an application ("App") or a cloud memory ("cloud persistence"), or vice versa.

In a second example, by a similar request, the program module FC1 is called, although it does not itself directly access a data module but also a further program module FCn of the automation program, which is not however itself enabled for direct access by the web server and is therefore called indirectly by the module FC1 here. Subsequently, for example, desired actions may be performed by the program module FCn or data may be transmitted back to the called program module FC1, which data may then be forwarded to the web server, or the like. In FIG. 1, it is furthermore represented that the program module FCn may also be called by the "main loop", i.e., the organization module OB1.

In summary, it may be stated that, via the mechanisms outlined, asynchronous calling of functions (e.g., program modules, function calls, or methods) of an automation program is possible, in which case the programmable controller SPS may then decide via the administration device VE about the execution, load-dependently or with the aid of other criteria. Parameters from these calls ("requests") may then be exchanged with the data memory of the programmable controller, together with data modules. What is important in this context is that the "business logic" for execution of the calls is implemented on the side of the automation program, and can therefore be programmed by the programmer of the automation program via a programming language intended for automation programs and therefore familiar to the programmer, and all of the data exchange is therefore also implemented under the control of the automation program. The web server WS integrated in the programmable controller SPS is capable in accordance with the invention of assigning paths (e.g., URL) called via HTTP or other network protocols to the corresponding program modules. Furthermore, access data are advantageously checked. A transferred or requested parameter is forwarded to the respectively called program module FC1 FC2. There, validation and type conversion are optionally performed. Any output parameter (in the case of read access) is sent to the caller, ultimately to the client CL, in accordance with the protocol. This includes values optionally being converted into strings, so that the response is given as JavaScript Object Notation (JSON) or extensible markup language (xml) or in another notation, depending on the request protocol.

Application examples of such an architecture are, for example, smart home solutions (control of shutters, light, etc. in building automation), packaging lines (change of throughput numbers, etc.) and other applications in which conventional clients CL are intended to be connected in a straightforward way to a programmable controller SPS. Special technologies such as OPC-UA are not required in this case.

Figure 2:
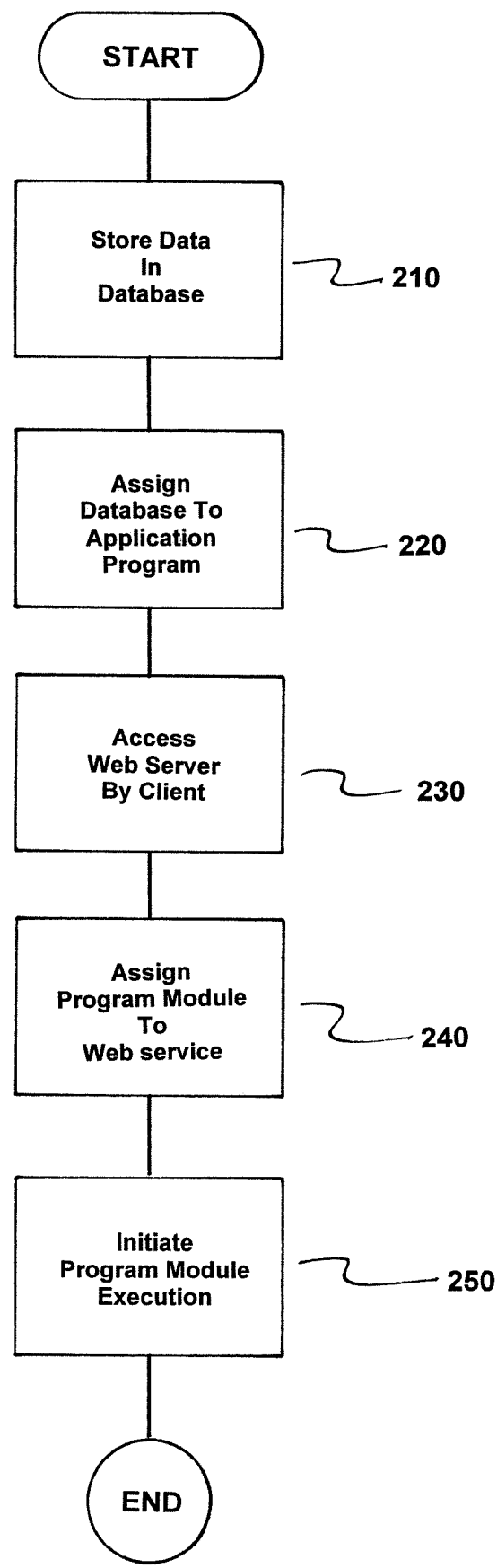
FIG. 2 is a flowchart of the method in accordance with the invention.

FIG. 2 is a flowchart of a method for accessing data or functions of a programmable controller (SPS) via a network protocol. The method comprises storing the data being stored in a database (DB1) of the programmable controller (SPS), as indicated in step 210.

Next, the database (DB1) is assigned to an application program of the programmable controller (SPS), as indicated in step 220.

Next, a web server of the programmable controller (SPS) is accessed by a client (CL) via the network protocol, as indicated in step 230. Next, at least one program module (FC1, FC2) of an automation program of the programmable controller (SPS) is assigned to a web service of the web server (WS), as indicated in step 240.

Execution of the program module (FC1, FC2) in now initiate by the web service, as indicated in step 250.

While there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for accessing data of a programmable controller via a network protocol, the method comprising:
   storing the data in a database of the programmable controller;
   assigning the database to an application program of the programmable controller;
   accessing a web server of the programmable controller by a client via the network protocol, the web server enabling individual program modules of an automation program of the programmable controller which is called by the web server when planning an industrial automation arrangement;
   assigning at least one program module of the individual program modules of the automation program of the programmable controller to a web service of the web server; and
   initiating execution of the at least one program module by the web service based on a decision performed by an administration device directly arranged between the web server and the at least one program module of the individual program modules of the automation program of the programmable controller to provide operative communication of the administration device with the web server and the at least one program module of the automation program of the programmable controller;
   wherein the execution of the at least one program module is performed in the event of an initiation by external request as soon as a run of the automation program has reached a defined state comprising a cycle start or a cycle end of a cycle based automation program.

2. The method as claimed in patent claim 1, wherein access to the data of the programmable controller is performed by the at least one program module, and one of (i) at least one parameter provided by the web service being written into the database as describing the data and (ii) the data are read out from the database and transmitted as the at least one parameter to the web service, or both.

3. The method as claimed in patent claim 1, wherein the decision comprises whether an initiated call of the at least one program module occurs or does not occur.

4. The method as claimed in patent claim 2, wherein the decision comprises whether an initiated call of the at least one program module occurs or does not occur.

5. The method as claimed in patent claim 3, wherein the decision is made aided by a workload of the programmable controller.

6. The method as claimed in patent claim 1, wherein a part of the automation program running at this time is interrupted to execute the at least one program module.

7. The method as claimed in patent claim 1, wherein the client comprises a web browser or an application of a mobile terminal or a cloud-based service.

8. The method as claimed in patent claim 1, wherein a data module of the automation program is used as the database.

9. A programmable controller having access to data via a network protocol, the programmable controller comprising:
   a processor;
   a database which stores the data;
   a web server for access to the data, the web server enabling individual program modules of an automation program of the programmable controller which is called by the web server when planning an industrial automation arrangement; and
   an administration device directly arranged between the web server and at least one program module of the individual program modules of the automation program of the programmable controller to provide operative communication of the administration device with the web server and the at least one program module of the automation program of the programmable controller;
   wherein the programmable controller is configured to assign the at least one program module of the automation program to a web service of the web server; and
   wherein the web service is configured to initiate execution of the at least one program module based on a decision performed by the administration device;
   wherein the execution of the at least one program module is performed in the event of an initiation by external request as soon as a run of the automation program has reached a defined state comprising a cycle start or a cycle end of a cycle based automation program.

10. The programmable controller as claimed in patent claim 9, wherein the at least one program module is configured to provide access to the data; and wherein one of (i) at least one parameter provided by the web service is written into the database as describing the data and (ii) at least some of the data are read out from the database and transmitted as the at least one parameter to the web service, or both.

11. The programmable controller as claimed in patent claim 9, wherein the administration device is configured to one of (i) perform or enable an initiated call of the program module and (ii) not perform or not enable the initiated call of the program module.

12. The programmable controller as claimed in patent claim 10, wherein the administration device is configured to one of (i) perform or enable an initiated call of the program module and (ii) not perform or not enable the initiated call of the program module.

13. The programmable controller as claimed in patent claim 11, wherein the administration device is configured to render the decision with respect to a call of the at least one program module aided by a workload of the programmable controller.

14. The programmable controller as claimed in patent claim 9, wherein the programmable controller is configured to interrupt a part of the automation program running at this time to execute the at least one program module.

15. The programmable controller as claimed in patent claim 9, wherein the web server is configured to communicate with a web browser or an application of a mobile terminal or of a cloud-based service as a client.

16. The programmable controller as claimed in patent claim 9, wherein the database is a data module of the automation program.

* * * * *